(12) United States Patent
Zhang et al.

(10) Patent No.: US 12,277,387 B2
(45) Date of Patent: Apr. 15, 2025

(54) TEXT PROCESSING METHOD

(71) Applicant: BEIJING BAIDU NETCOM SCIENCE TECHNOLOGY CO., LTD., Beijing (CN)

(72) Inventors: Ruiqing Zhang, Beijing (CN); Zhongjun He, Beijing (CN); Zhi Li, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 282 days.

(21) Appl. No.: 18/056,197

(22) Filed: Nov. 16, 2022

(65) Prior Publication Data

US 2023/0101401 A1    Mar. 30, 2023

(30) Foreign Application Priority Data

Nov. 16, 2021   (CN) .......................... 202111357039.5

(51) Int. Cl.
  *G06F 40/232*  (2020.01)
  *G06F 40/279*  (2020.01)
  *G06F 40/53*   (2020.01)
(52) U.S. Cl.
  CPC .......... *G06F 40/232* (2020.01); *G06F 40/279* (2020.01); *G06F 40/53* (2020.01)

(58) Field of Classification Search
  CPC ...... G06F 40/232; G06F 40/279; G06F 40/53; G06F 40/216; G06F 40/289
  See application file for complete search history.

(56) References Cited

FOREIGN PATENT DOCUMENTS

| | | | | |
|---|---|---|---|---|
| CN | 110083819 A |   | 8/2019 | |
| CN | 111460800 A |   | 7/2020 | |
| CN | 111626048 A | * | 9/2020 | ........... G06F 40/232 |
| CN | 111832310 A |   | 10/2020 | |
| CN | 112270173 A | * | 1/2021 | ........... G06F 40/216 |
| JP | WO2005069158 A1 |   | 4/2008 | |

* cited by examiner

*Primary Examiner* — Yogeshkumar Patel
(74) *Attorney, Agent, or Firm* — Seed IP Law Group LLP

(57) ABSTRACT

A text processing method is provided. The method includes: a first probability value of each candidate character of a plurality of candidate characters corresponding to a target position is determined based on character feature information corresponding to the target position in a text fragment to be processed, wherein the character feature information is determined based on a context at the target position in the text fragment to be processed; a second probability value of each candidate character of the plurality of candidate characters is determined based on a character string including the candidate character and at least one character in at least one position in the text fragment to be processed adjacent to the target position; and a correction character at the target position is determined based on the first probability value and the second probability value of each candidate character of the plurality of candidate characters.

17 Claims, 3 Drawing Sheets

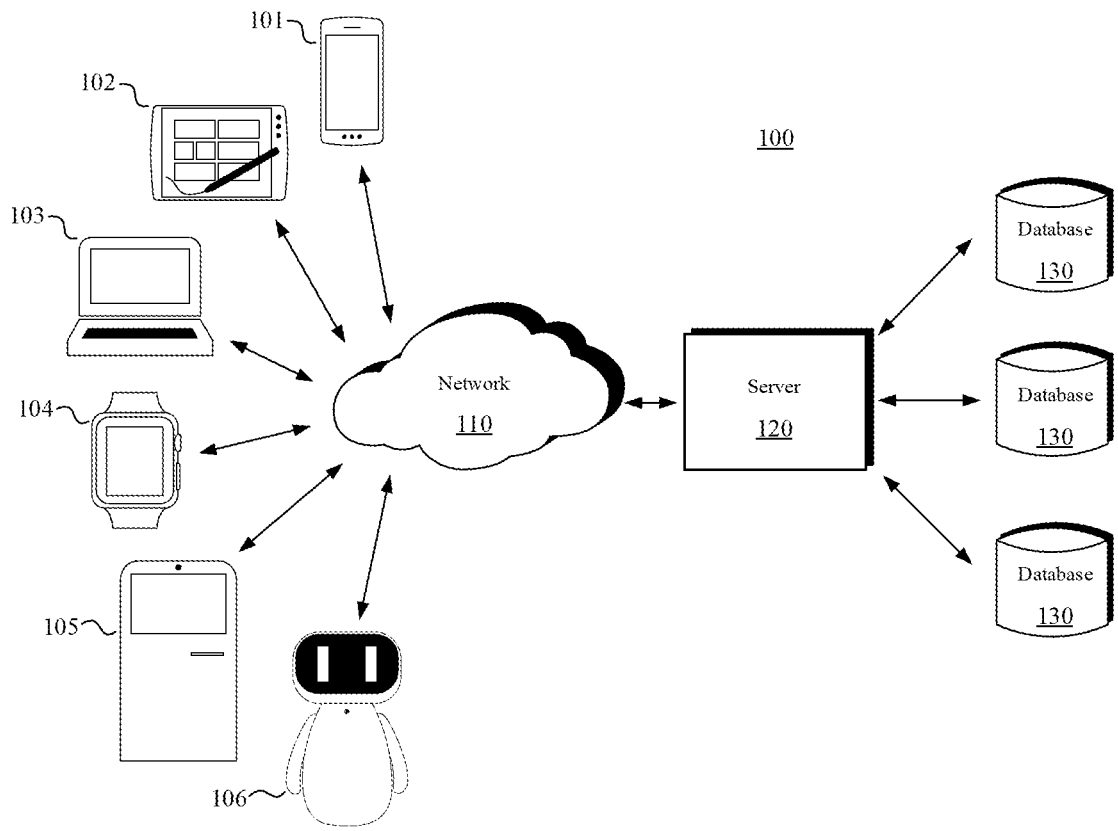

*Fig. 1*

| |
|---|
| Determining a first probability value of each candidate character of a plurality of candidate characters corresponding to a target position based on a character feature information corresponding to the target position in a text fragment to be processed, wherein the character feature information is determined based on a context at the target position in the text fragment to be processed |

S201

| |
|---|
| Determining a second probability value of each candidate character of the plurality of candidate characters based on a character string consisting of the candidate character and at least one character in at least one position in the text fragment to be processed adjacent to the target position |

S202

| |
|---|
| Determining a correction character at the target position based on the first probability value and the second probability value of each candidate character of the plurality of candidate characters |

TEXT PROCESSING METHOD

CROSS-REFERENCE TO RELATED APPLICATION

This application claims priority to Chinese patent application No. 202111357039.5, filed on Nov. 16, 2021, the contents of which are hereby incorporated by reference in their entirety for all purposes.

BACKGROUND

Technical Field

The present disclosure relates to the technical field of artificial intelligence, particularly relates to the technical field of text processing, and specifically relates to a text processing method, an electronic device, and a computer readable storage medium.

Description of the Related Art

Artificial intelligence is a subject that studies how to make computers simulate some human thinking processes and intelligent behaviors (such as learning, reasoning, thinking, planning, etc.), and it has both hardware and software technologies. Artificial intelligence hardware technology generally includes technologies such as sensors, dedicated artificial intelligence chips, cloud computing, distributed storage, big data processing, etc. Artificial intelligence software technology mainly includes computer vision technology, speech recognition technology, natural language processing technology, machine learning/deep learning, big data processing technology, knowledge mapping technology, etc.

Methods described in this section are not necessarily those previously envisaged or adopted. Unless otherwise specified, it should not be assumed that any method described in this section is considered the prior art only because it is included in this section. Similarly, unless otherwise specified, the issues raised in this section should not be considered to have been universally acknowledged in any prior art.

BRIEF SUMMARY

The present disclosure provides a text processing method, an electronic device, and a computer readable storage medium.

According to an aspect of the present disclosure, a text processing method is provided, including: determining a first probability value of each candidate character of a plurality of candidate characters corresponding to a target position based on character feature information corresponding to the target position in a text fragment to be processed, wherein the character feature information is determined at least based on a context at the target position in the text fragment to be processed; determining a second probability value of each candidate character of the plurality of candidate characters based on a character string including the candidate character and at least one character in at least one position in the text fragment to be processed adjacent to the target position; and determining a correction character at the target position based on the first probability value and the second probability value of each candidate character of the plurality of candidate characters.

According to an aspect of the present disclosure, an electronic device is provided, including: one or more processors; and a memory storing one or more programs configured to be executed by the one or more processors, the one or more programs comprising instructions for performing operations comprising: determining a first probability value of each candidate character of a plurality of candidate characters corresponding to a target position based on a character feature information at the target position in a text fragment to be processed, wherein the character feature information is determined based on a context at the target position in the text fragment to be processed; determining a second probability value of each candidate character of the plurality of candidate characters based on a character string including the candidate character and at least one character in at least one position in the text fragment to be processed adjacent to the target position; and determining a correction character at the target position based on the first probability value and the second probability value of each candidate character of the plurality of candidate characters.

According to an aspect of the present disclosure, a non-transitory computer readable storage medium is provided. The non-transitory computer readable storage medium storing one or more programs comprising instructions that, when executed by one or more processors of an electronic device, cause the electronic device to perform operations comprising: determining a first probability value of each candidate character of a plurality of candidate characters corresponding to a target position based on a character feature information corresponding to the target position in a text fragment to be processed, wherein the character feature information is determined based on a context at the target position in the text fragment to be processed; determining a second probability value of each candidate character of the plurality of candidate characters based on a character string including the candidate character and at least one character in at least one position in the text fragment to be processed adjacent to the target position; and determining a correction character at the target position based on the first probability value and the second probability value of each candidate character of the plurality of candidate characters.

It should be understood that the content described in this section is not intended to identify key or important features of the embodiments of the present disclosure, nor is it used to limit the scope of the present disclosure. Other features of the present disclosure will be easily understood by the following description.

BRIEF DESCRIPTION OF THE SEVERAL VIEWS OF THE DRAWINGS

The accompanying drawings exemplarily illustrate embodiments and form part of the description, which, together with the textual description of the description, is used to explain example implementations of the embodiments. The illustrated embodiments are for illustrative purposes only and do not limit the scope of the claims. In all the accompanying drawings, the same reference numerals refer to similar but not necessarily identical elements.

FIG. 1 shows a schematic diagram of an example system in which various methods described herein may be implemented according to an embodiment of the present disclosure.

FIG. 2 shows a flow diagram of a text processing method according to an embodiment of the present disclosure.

DETAILED DESCRIPTION

Figure 3:
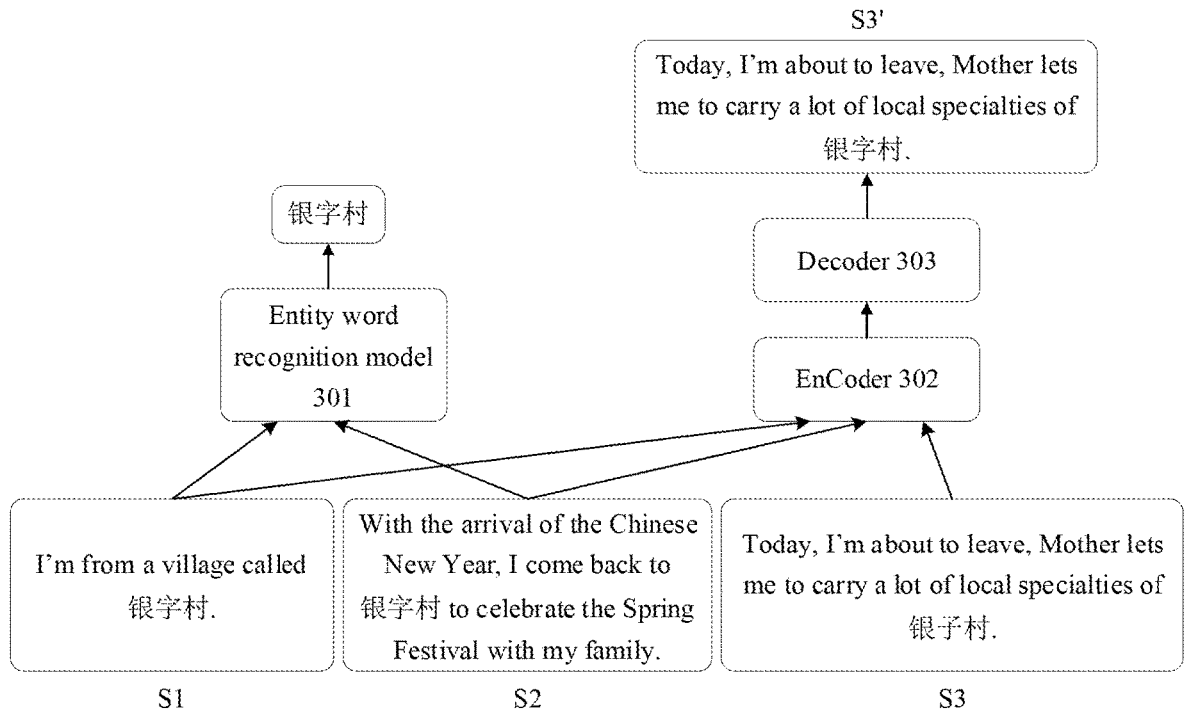
FIG. 3 shows a schematic diagram of a text processing method according to an embodiment of the present disclosure.

The example embodiments of the present disclosure are described below in combination with the accompanying drawings, including various details of the embodiments of the present disclosure to facilitate understanding, which should be considered only example. Therefore, those of ordinary skill in the art should recognize that various changes and modifications may be made to the embodiments described herein without departing from the scope of the present disclosure. Similarly, for clarity and conciseness, the description of well-known functions and structures is omitted from the following description.

In the present disclosure, unless otherwise specified, the terms "first", "second" and the like are used to describe various elements and are not intended to limit the positional relationship, temporal relationship or importance relationship of these elements. These terms are only used to distinguish one element from another element. In some examples, a first element and a second element may point to the same instance of the element, and in some cases, based on the context description, they can also refer to different instances.

The terms used in the description of the various examples in the present disclosure are only for the purpose of describing specific examples and are not intended to be limiting. Unless the context clearly indicates otherwise, if the number of elements is not specifically limited, the element may be one or more. In addition, the term "and/or" as used in the present disclosure covers any and all possible combinations of the listed items.

The inventors recognize that semantic analysis is often used to correct wrong words in a text. Under this error correction mechanism, common words and phrases often have a higher probability of being recognized as being correct, while uncommon words and phrases, such as an author's own words, rare terms, people's names, place names, etc., may be mistaken as errors, resulting in the wrong correction of the originally correct words and phrases, which results in poor accuracy of text error correction and affects the user experience.

The present disclosure provides a text processing method. A first probability value of each candidate character of a plurality of candidate characters corresponding to a target position based on character feature information corresponding to the target position in a text fragment to be processed. On this basis, for the plurality of candidate characters at the target position in the text fragment to be processed, a second probability value of the candidate character is determined based on a character string including the candidate character and at least one character in at least one position in the text fragment to be processed adjacent to the target position, and the first probability value of the candidate character is corrected by means of the second probability value to accurately judge the possibility that the candidate character is a correct character at the target position based on both the first probability value and the second probability value of each candidate character, thereby accurately judging a correction character corresponding to the target position, improving the accuracy of text error correction and improving the user experience.

The embodiments of the present disclosure will be described in detail below in combination with the accompanying drawings.

FIG. 1 shows a schematic diagram of an example system 100 in which various methods and apparatuses described herein may be implemented according to an embodiment of the present disclosure. Referring to FIG. 1, the system 100 includes one or more client devices 101, 102, 103, 104, 105 and 106, a server 120 and one or more communication networks 110 coupling the one or more client devices to the server 120. The client devices 101, 102, 103, 104, 105 and 106 may be configured to execute one or more applications.

In the embodiment of the present disclosure, the server 120 may run one or more service or software applications capable of implementing the text processing method.

In certain embodiments, the server 120 may further provide other service or software applications that may include non-virtual environments and virtual environments. In certain embodiments, these services may be provided as web-based services or cloud services, such as being provided to users of the client devices 101, 102, 103, 104, 105 and/or 106 under a software as a service (SaaS) model.

In a configuration shown in FIG. 1, the server 120 may include one or more components implementing functions executed by the server 120. These components may include a software component, a hardware component or their combinations that may be executed by one or more processors. The users operating the client devices 101, 102, 103, 104, 105 and/or 106 may sequentially utilize one or more client applications to interact with the server 120 so as to utilize services provided by these components. It should be understood that various different system configurations are possible, which may be different from the system 100. Therefore, FIG. 1 is an example of a system for implementing the various methods described herein, and is not intended to be limiting.

A user may use the client devices 101, 102, 103, 104, 105 and/or 106 to obtain a text to be processed. The client devices may provide interfaces enabling the users of the client devices to be capable of interacting with the client devices. The client devices may further output information to the users via the interfaces. Although FIG. 1 only depicts six client devices, those skilled in the art can understand that the present disclosure may support any number of client devices.

The client devices 101, 102, 103, 104, 105 and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various message transceiving devices, a sensor or other sensing devices, etc. These computer devices may run various types and versions of software applications and operating systems, such as MICROSOFT Windows, APPLE iOS, UNIX-like operating systems, and Linux or Linux-like operating systems (such as GOOGLE Chrome OS); or include various mobile operating systems, such as MICROSOFT Windows Mobile OS, iOS, Windows Phone and Android. The portable handheld device may include a cell phone, a smart phone, a tablet computer, a personal digital assistant (PDA) and the like. The wearable device may include a head-mounted display (such as intelligent glasses) and other devices. The gaming system may include various handheld gaming devices, gaming devices supporting the Internet and the like. The client devices can execute various different applications, such as various Internet-related applications, communication applications (such as e-mail applications), and short message service (SMS) applications, and may use various communication protocols.

The network 110 may be any type of network well known to those skilled in the art, which may use any one of various available protocols (including but not limited to TCP/IP, SNA, IPX, etc.) to support data communication. Only as examples, one or more networks 110 may be a local area network (LAN), an Ethernet-based network, a token ring, a wide area network (WAN), the Internet, a virtual network, a virtual private network (VPN), an intranet, an external network, a public switched telephone network (PSTN), an infrared network, a wireless network (e.g., Bluetooth, Wi-F), and/or any combination of these and/or other networks.

The server 120 may include one or more general-purpose computers, dedicated server computers (e.g., PC (personal computer) servers, UNIX servers, and midrange servers), blade servers, mainframe computers, server clusters, or any other suitable arrangement and/or combination. The server 120 may include one or more virtual machines running virtual operating systems, or other computing frameworks involving virtualization (e.g., one or more flexible pools of logical storage devices that may be virtualized to maintain virtual storage devices of the server). In various embodiments, the server 120 may run one or more service or software applications providing the functions described below.

A computing unit in the server 120 may run one or more operating systems including any above operating system and any commercially available server operating system. The server 120 may further run any one of various additional server applications and/or intermediate layer applications, including an HTTP server, an FTP server, a CGI server, a JAVA server, a database server and the like.

In some implementations, the server 120 may include one or more applications to analyze and combine data feed and/or event updating received from the users of the client devices 101, 102, 103, 104, 105 and/or 106. The server 120 may further include one or more applications to display data feed and/or real-time events via one or more display devices of the client devices 101, 102, 103, 104, 105 and/or 106.

In some implementations, the server 120 may be a server of a distributed system, or a server combined with a block chain. The server 120 may further be a cloud server, or a smart cloud computing server or smart cloud host with an artificial intelligence technology. The cloud server is a host product in a cloud computing service system to solve the defects of large management difficulty and weak business expansibility existing in traditional physical host and virtual private server (VPS) services.

The system 100 may further include one or more databases 130. In certain embodiments, these databases may be used to store data and other information. For example, one or more of the databases 130 may be used to store, for example, information of video files and video files. The databases 130 may reside at various positions. For example, a database used by the server 120 may be local to the server 120 or may be away from the server 120 and may communicate with the server 120 via and based on a network or specific connection. The databases 130 may be of different types. In certain embodiments, the database used by the server 120 may be, for example, a relational database. One or more of these databases may respond to a command to store, update and retrieval data to and from the databases.

In certain embodiments, one or more of the databases 130 may further be used by applications to store application data. The databases used by the applications may be different types of databases, such as a key value storage base, an object storage base or a conventional storage base supported by a file system.

The system 100 of FIG. 1 may be configured and operated in various modes to be capable of applying various methods and apparatuses described according to the present disclosure.

In the technical solution of the present disclosure, involved collection, storage, use, processing, transmission, provision, disclosure and other processing of personal information of users comply with the provisions of relevant laws and regulations, and do not violate public order and good customs.

FIG. 2 shows a flow diagram of a text processing method according to an example embodiment of the present disclosure. As shown in FIG. 2, the method includes: step S201, a first probability value of each candidate character of a plurality of candidate characters corresponding to a target position is determined based on character feature information corresponding to the target position in a text fragment to be processed, wherein the character feature information is determined at least based on a context at the target position in the text fragment to be processed; step S202, a second probability value of each candidate character of the plurality of candidate characters is determined based on a character string including the candidate character and at least one character in at least one position in the text fragment to be processed adjacent to the target position; and step S203, a correction character at the target position is determined based on the first probability value and the second probability value of each candidate character of the plurality of candidate characters.

Thus, the first probability value of each candidate character may be corrected by means of the second probability value thereof, so that the possibility that the candidate character is a correct character at the target position can be accurately judged based on both the first probability value and the second probability value of each candidate character, thereby accurately judging a correction character corresponding to the target position, improving the accuracy of text error correction and improving the user experience.

For step S201, according to some embodiments, the text fragment to be processed is one sentence in a text to be processed.

According to some embodiments, the text to be processed may be divided into a plurality of text fragments to be processed with a sentence as a unit through one or more manners of recognition on punctuations in the text to be processed or semantic analysis, etc.

According to some embodiments, all character positions in the text fragment to be processed may be sequentially determined as the target position, and then processing on the target position is performed.

According to some embodiments, positions where one or more characters with the lower confidence degree in the text fragment to be processed are located may be determined as the target position by utilizing a trained model, and then processing on the target position is performed.

According to some embodiments, prior to the determining a first probability value of each candidate character of a plurality of candidate characters corresponding to a target position based on character feature information corresponding to the target position in a text fragment to be processed, fragment feature information of the text fragment to be processed and fragment feature information of each of a plurality of reference text fragments are determined respectively, wherein the plurality of reference text fragments and the text fragment to be processed are from the same text to be processed; overall feature information of the text fragment to be processed is determined based on the fragment feature information of the text fragment to be processed and the fragment feature information of each of the plurality of reference text fragments; and the character feature information corresponding to the target position in the text fragment to be processed is determined based on the overall feature information of the text fragment to be processed.

Thus, the character feature information corresponding to the target position may be fused with information of a plurality of text fragments in the whole text to be processed and is not only limited to the text fragment to be processed itself, so that the determined character feature information corresponding to the target position can, under the context of the whole text to be processed, more accurately reflect a feature of a correct character that should appear at the target position, thereby improving the accuracy of error correction.

It can be understood that the fragment feature information of the text fragment to be processed is a feature of the text fragment to be processed represented under the context of the text fragment to be processed itself, and the fragment feature information of each of the plurality of reference text fragments is a feature of the reference text fragment represented under the context of the reference text fragment itself. The overall feature information of the text fragment to be processed is a feature of the text fragment to be processed represented under the context of the whole text fragment to be processed.

According to some embodiments, a set composed of the plurality of reference text fragments may be other parts except the text fragment to be processed in the text to be processed.

According to some embodiments, the text fragment to be processed may be input to a trained first module to obtain the fragment feature information of the text fragment to be processed.

According to some embodiments, each of the plurality of reference text fragments may be input to a trained first module to obtain the fragment feature information of each of the plurality of reference text fragments.

According to some embodiments, the fragment feature information of the text fragment to be processed and the fragment feature information of each of the plurality of reference text fragments may be input to a trained second module at the same time to obtain the overall feature information of the text fragment to be processed.

According to some embodiments, the determining overall feature information of the text fragment to be processed based on the fragment feature information of the text fragment to be processed and the fragment feature information of each of the plurality of reference text fragments includes: the overall feature information of the text fragment to be processed is determined by utilizing a multi-head-attention mechanism.

According to some embodiments, the plurality of candidate characters corresponding to the target position may be all characters included in a preset character set.

For step S202, according to some embodiments, the determining a second probability value of the candidate character includes: in response to that the character string including the candidate character and the at least one character corresponding to at least one position in the text fragment to be processed adjacent to the target position is a pre-stored entity word, it is determined that the second probability value of the candidate character is a positive number, wherein the pre-stored entity word is determined based on entity word recognition performed on remaining fragments other than the text fragment to be processed in a text to be processed.

Thus, in the case that the character string including a certain candidate character is an entity word that has appeared in other parts of the text to be processed, a probability value corresponding to the candidate character may be increased, and then the possibility that the candidate character is determined as the correction character is improved, avoiding the problem that unusual words in entity words are wrongly corrected.

According to some embodiments, the entity word may further include a naming entity word. The naming entity word may be a person's name, an institute's name, a place name and all other entities with names as identifications.

According to some embodiments, before the second probability value of the candidate character is determined, entity word recognition is performed on the plurality of reference text fragments by utilizing an entity word recognition model, and recognized entity words are stored in an entity word set.

According to some embodiments, the entity word recognition model is used to perform entity word recognition on the character string including the candidate character in the text fragment to be processed and the at least one character corresponding to at least one position in the text fragment to be processed adjacent to the target position; in the case that the entity word is recognized from the character string, the recognized entity word may be compared with each entity word in the entity word set; and the recognized entity word is determined as the pre-stored entity word in response to that the recognized entity word is consistent with any entity word in the entity word set.

According to some embodiments, the second probability value of the candidate character is in positive correlation with a number of times that the pre-stored entity word is applied in the remaining fragments of the text to be processed. Thus, in the case that an entity word including the candidate character frequently appears in the remaining fragments of the text to be processed, the candidate character is given a higher second probability value, so as to increase the probability that the candidate character is determined as the correction character.

According to some embodiments, in response to that the character string including the candidate character and the at least one character corresponding to at least one position in the text fragment to be processed adjacent to the target position is not a pre-stored entity word, it is determined that the second probability value of the candidate character is zero.

After the first probability value and the second probability value of each candidate character of the plurality of candidate characters are determined, step S203 may be further executed, that is, the correction character at the target position is determined based on the first probability value and the second probability value of each candidate character of the plurality of candidate characters.

According to some embodiments, the determining a correction character at the target position based on the first probability value and the second probability value of each candidate character of the plurality of candidate characters may include: a weighted sum of the first probability value and the second probability value of each candidate character of the plurality of candidate characters is determined; and an candidate character with the largest weighted sum in the plurality of candidate characters is determined as the correction character.

FIG. 3 shows a schematic diagram of a text processing method according to an example embodiment of the present disclosure. S1 and S2 are a plurality of reference text fragments, and S3 is a text fragment to be processed.

As shown in FIG. 3, an entity word recognition model 301 performs entity word recognition on S1 and S2, recognizes an entity word "银字村", and stores the "银字村" in an entity word set as a pre-stored entity word.

S1, S2 and S3 are input to an encoder 302 respectively to be coded so as to obtain overall feature information of the text fragment to be processed S3. In some embodiments, the encoder 302 may be composed of a first module and a second module. The first module codes S1, S2 and S3 respectively to obtain fragment feature information corresponding to S1, S2 and S3 respectively. The fragment feature information corresponding to S1, S2 and S3 respectively is input to the second module to obtain the overall feature information of the text fragment to be processed S3.

Based on the overall feature information of the text fragment to be processed S3, a decoder 303 may sequentially use positions where all characters in input S3 are located as a target position, and then S3 is corrected. For example, as shown in FIG. 3, the position where "字" in S3 is located is used as the target position, a first probability value of each candidate character of the plurality of candidate characters corresponding to the target position is determined based on the overall feature information of the text fragment to be processed S3, wherein the candidate characters include: "子", "字", etc. For "字" in the plurality of candidate characters, since the character string "银字村" including "字" and characters at front and back positions in S3 adjacent to the target position is a pre-stored entity word, the candidate character "字" may be given a positive second probability value to increase a total probability value of the candidate character "字". Finally, based on a weighted sum of the first probability value and the second probability value of each candidate character, it is determined that the candidate character "字" is a correction character, and corrected S3' is output.

It can be understood that it is only for the ease of expression by adopting two sentences S1 and S2 as reference text fragments in FIG. 3, and the number of the reference text fragments is not limited in the present disclosure.

Figure 4:
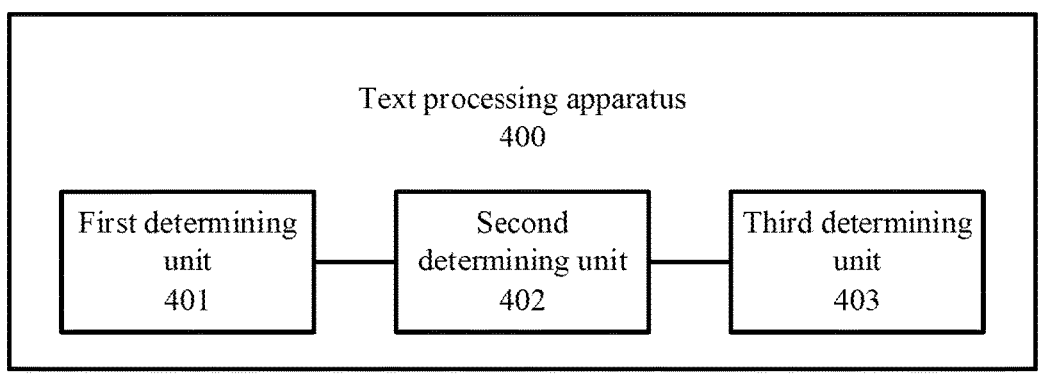
FIG. 4 shows a structural block diagram of a text processing apparatus according to an embodiment of the present disclosure.

FIG. 4 shows a structural block diagram of a text processing apparatus according to an example embodiment of the present disclosure. As shown in FIG. 4, the apparatus 400 includes: a first determining unit 401, configured to determine a first probability value of each candidate character of a plurality of candidate characters corresponding to a target position based on character feature information corresponding to the target position in a text fragment to be processed, wherein the character feature information is determined at least based on a context at the target position in the text fragment to be processed; a second determining unit 402, configured to determine a second probability value of each candidate character of the plurality of candidate characters based on a character string including the candidate character and at least one character in at least one position in the text fragment to be processed adjacent to the target position; and a third determining unit 403, configured to determine a correction character at the target position based on the first probability value and the second probability value of each candidate character of the plurality of candidate characters.

According to some embodiments, the second determining unit includes: a sub-unit, configured to determine, in response to that the character string including the candidate character and the at least one character in at least one position in the text fragment to be processed adjacent to the target position is a pre-stored entity word, that the second probability value of the candidate character is a positive number, wherein the pre-stored entity word is determined based on entity word recognition performed on remaining fragments other than the text fragment to be processed in a text to be processed.

According to some embodiments, the second probability value of the candidate character is in positive correlation with a number of times that the pre-stored entity word is applied in the remaining fragments of the text to be processed.

According to some embodiments, the second determining unit includes: a sub-unit, configured to determine, in response to that the character string including the candidate character and the at least one character in at least one position in the text fragment to be processed adjacent to the target position is not a pre-stored entity word, that the second probability value of the candidate character is zero.

According to some embodiments, the apparatus further includes: a fourth determining unit, configured to determine fragment feature information of the text fragment to be processed and fragment feature information of each of a plurality of reference text fragments respectively, wherein the plurality of reference text fragments and the text fragment to be processed are from the same text to be processed; a fifth determining unit, configured to determine overall feature information of the text fragment to be processed based on the fragment feature information of the text fragment to be processed and the fragment feature information of each of the plurality of reference text fragments; and a sixth determining unit, configured to determine the character feature information corresponding to the target position in the text fragment to be processed based on the overall feature information of the text fragment to be processed.

According to some embodiments, the fifth determining unit includes: a sub-unit, configured to determine the overall feature information of the text fragment to be processed by utilizing a multi-head-attention mechanism.

According to some embodiments, the text fragment to be processed is one sentence in the text to be processed.

According to an embodiment of the present disclosure, an electronic device is further provided, including: at least one processor; and a memory in communication connection with the at least one processor; wherein the memory stores instructions capable of being executed by the at least one processor, and the instructions are executed by the at least one processor to cause the at least one processor to be capable of executing the above method.

According to an embodiment of the present disclosure, a non-transitory computer readable storage medium storing computer instructions is further provided, wherein, the computer instructions are used to cause a computer to execute the above method.

According to an embodiment of the present disclosure, a computer program product is further provided, including a computer program, wherein, the computer program, when executed by a processor, implements the above method.

Figure 5:
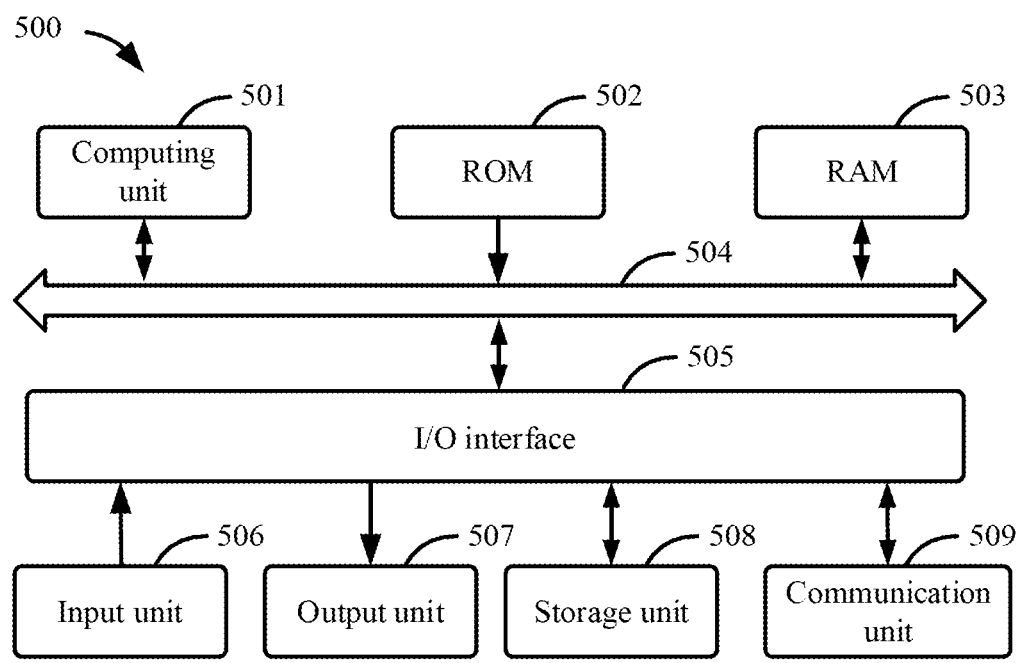
FIG. 5 shows a structural block diagram of an example electronic device capable of being used to implement an embodiment of the present disclosure.

Referring to FIG. 5, a structural block diagram of an electronic device 500 that may serve as a server or a client of the present disclosure will now be described, and it is an example of a hardware device that may be applied to various aspects of the present disclosure. The electronic device is intended to represent various forms of digital electronic computer devices, such as, a laptop computer, a desktop computer, a workstation, a personal digital assistant, a server, a blade server, a mainframe computer, and other suitable computers. The electronic device may further represent various forms of mobile apparatuses, such as, personal digital processing, a cell phone, a smart phone, a wearable device and other similar computing apparatuses. The components shown herein, their connections and relationships, and their functions are merely used as examples, and are not intended to limit the implementations of the present disclosure described and/or required herein.

As shown in FIG. 5, the electronic device 500 includes a computing unit 501 that may perform various appropriate actions and processing according to computer programs stored in a read-only memory (ROM) 502 or computer programs loaded from a storage unit 508 into a random access memory (RAM) 503. In the RAM 503, various programs and data required for operations of the electronic device 500 may further be stored. The computing unit 501, the ROM 502 and the RAM 503 are connected to each other through a bus 504. An input/output (I/O) interface 505 is also connected to the bus 504.

A plurality of components in the electronic device 500 are connected to the I/O interface 505, including: an input unit 506, an output unit 507, a storage unit 508 and a communication unit 509. The input unit 506 may be any type of device capable of inputting information to the electronic device 500. The input unit 506 may receive input digital or character information and generate key signal input related to user settings and/or function control of the electronic device, and may include but not limited to a mouse, a keyboard, a touch screen, a trackpad, a trackball, a joystick, a microphone and/or a remote control. The output unit 507 may be any type of device capable of presenting information, and may include but not limited to a display, a speaker, a video/audio output terminal, a vibrator and/or a printer. The storage unit 508 may include but not limited to a magnetic disk and an optical disk. The communication unit 509 allows the electronic device 500 to exchange information/data with other devices through computer networks such as the Internet and/or various telecommunication networks, and may include but not limited to a modem, a network card, an infrared communication device, a wireless communication transceiver and/or a chipset, such as a Bluetooth™ device, an 802.11 device, a Wi-Fi device, a WiMAX device, a cellular communication device and/or the like.

The computing unit 501 may be various general-purpose and/or special-purpose processing components with processing and computing capabilities. Some examples of the computing unit 501 include but not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, etc. The computing unit 501 performs various methods and processing described above, such as a text processing method. For example, in some embodiments, the text processing method may be implemented as a computer software program that is tangibly included in a machine-readable medium such as the storage unit 508. In some embodiments, part or all of the computer programs may be loaded and/or installed onto the electronic device 500 via the ROM 502 and/or the communication unit 509. When the computer programs are loaded into the RAM 503 and executed by the computing unit 501, one or more steps of the text processing method described above may be performed. Alternatively, in other embodiments, the computing unit 501 may be configured to perform the text processing method in any other suitable manner (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a complex programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents. More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer.

Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally far away from each other and usually interact through a communication network. The relationship between the client and the server is generated by computer programs running on the corresponding computer and having a client-server relationship with each other. The server may be a cloud server, and may also be a server of a distributed system, or a server combined with a block chain.

It should be understood that the various forms of processes shown above may be used to reorder, add, or delete steps. For example, the steps recorded in the present disclosure may be performed in parallel, sequentially or in different orders, as long as the desired results of the technical solution disclosed by the present disclosure can be achieved, which is not limited herein.

Although the embodiments or examples of the present disclosure have been described with reference to the accompanying drawings, it should be understood that the above methods, systems and devices are only example embodiments or examples, and the scope of the present disclosure is not limited by these embodiments or examples, but only by the authorized claims and their equivalent scope. Various elements in the embodiments or examples may be omitted or replaced by their equivalent elements. In addition, the steps may be performed in an order different from that described in the present disclosure. Further, various elements in the embodiments or examples may be combined in various ways. It is important that as technology evolves, many of the elements described herein may be replaced by equivalent elements that appear after the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A text processing method, comprising:
    determining, by using a first module of an encoder, a fragment feature information of a text fragment and a fragment feature information of each of a plurality of reference text fragments respectively, wherein the plurality of reference text fragments and the text fragment are extracted from a same text to be processed;
    determining, by using a second module of an encoder, an overall feature information of the text fragment based on the fragment feature information of the text fragment and the fragment feature information of each of the plurality of reference text fragments;
    determining a character feature information corresponding to the target position in the text fragment based on the overall feature information of the text fragment;
    determining a first probability value of each candidate character of a plurality of candidate characters corresponding to the target position in the text fragment based on the character feature information corresponding to the target position, wherein the character feature information is determined based on a context of the target position in the text fragment;
    determining a second probability value of each candidate character of the plurality of candidate characters based on a character string including the candidate character and at least one character in at least one position in the text fragment adjacent to the target position; and
    determining a correction character at the target position based on the first probability value and the second probability value of each candidate character of the plurality of candidate characters.

2. The method according to claim 1, wherein the determining the second probability value of the candidate character comprises:
    in response to that the character string including the candidate character and the at least one character in the at least one position in the text fragment adjacent to the target position is a pre-stored entity word, determining that the second probability value of the candidate character is a positive number, wherein the pre-stored entity word is determined based on entity word recognition performed on remaining fragments other than the text fragment in a text to be processed.

3. The method according to claim 2, wherein the second probability value of the candidate character is in positive correlation with a number of times that the pre-stored entity word is applied in the remaining fragments of the text to be processed.

4. The method according to claim 2, further comprising:
    in response to that the character string including the candidate character and the at least one character in the at least one position in the text fragment adjacent to the target position is not a pre-stored entity word, determining that the second probability value of the candidate character is zero.

5. The method according to claim 1, wherein the determining the overall feature information of the text fragment based on the fragment feature information of the text fragment and the fragment feature information of each of the plurality of reference text fragments comprises:
    determining the overall feature information of the text fragment by utilizing a multi-head-attention mechanism.

6. The method according to claim 1, wherein the text fragment is a sentence in a text to be processed.

7. An electronic device, comprising:
one or more processors; and
a memory storing one or more programs configured to be executed by the one or more processors, the one or more programs comprising instructions for performing operations comprising:
determining, by using a first module of an encoder, a fragment feature information of a text fragment and a fragment feature information of each of a plurality of reference text fragments respectively, wherein the plurality of reference text fragments and the text fragment are extracted from a same text to be processed;
determining, by using a second module of an encoder, an overall feature information of the text fragment based on the fragment feature information of the text fragment and the fragment feature information of each of the plurality of reference text fragments;
determining a character feature information corresponding to the target position in the text fragment based on the overall feature information of the text fragment;
determining a first probability value of each candidate character of a plurality of candidate characters corresponding to the target position in the text fragment based on the character feature information corresponding to the target position, wherein the character feature information is determined based on a context of the target position in the text fragment;
determining a second probability value of each candidate character of the plurality of candidate characters based on a character string including the candidate character and at least one character in at least one position in the text fragment adjacent to the target position; and
determining a correction character at the target position based on the first probability value and the second probability value of each candidate character of the plurality of candidate characters.

8. The electronic device according to claim 7, wherein the determining the second probability value of the candidate character comprises:
in response to that the character string including the candidate character and the at least one character in the at least one position in the text fragment adjacent to the target position is a pre-stored entity word, determining that the second probability value of the candidate character is a positive number, wherein the pre-stored entity word is determined based on entity word recognition performed on remaining fragments other than the text fragment in a text to be processed.

9. The electronic device according to claim 8, wherein the second probability value of the candidate character is in positive correlation with a number of times that the pre-stored entity word is applied in the remaining fragments of the text to be processed.

10. The electronic device according to claim 8, wherein the operations further comprise:
in response to that the character string including the candidate character and the at least one character in the at least one position in the text fragment adjacent to the target position is not a pre-stored entity word, determining that the second probability value of the candidate character is zero.

11. The electronic device according to claim 7, wherein the determining the overall feature information of the text fragment based on the fragment feature information of the text fragment and the fragment feature information of each of the plurality of reference text fragments comprises:
determining the overall feature information of the text fragment by utilizing a multi-head-attention mechanism.

12. The electronic device according to claim 7, wherein the text fragment is a sentence in a text to be processed.

13. A non-transitory computer readable storage medium storing one or more programs comprising instructions that, when executed by one or more processors of an electronic device, cause the electronic device to perform operations comprising:
determining, by using a first module of an encoder, a fragment feature information of a text fragment and a fragment feature information of each of a plurality of reference text fragments respectively, wherein the plurality of reference text fragments and the text fragment are extracted from a same text to be processed;
determining, by using a second module of an encoder, an overall feature information of the text fragment based on the fragment feature information of the text fragment and the fragment feature information of each of the plurality of reference text fragments;
determining a character feature information corresponding to the target position in the text fragment based on the overall feature information of the text fragment;
determining a first probability value of each candidate character of a plurality of candidate characters corresponding to the target position in the text fragment based on the character feature information corresponding to the target position, wherein the character feature information is determined based on a context of the target position in the text fragment;
determining a second probability value of each candidate character of the plurality of candidate characters based on a character string including the candidate character and at least one character in at least one position in the text fragment adjacent to the target position; and
determining a correction character at the target position based on the first probability value and the second probability value of each candidate character of the plurality of candidate characters.

14. The computer readable storage medium of claim 13, wherein the determining the second probability value of the candidate character comprises:
in response to that the character string including the candidate character and the at least one character in the at least one position in the text fragment adjacent to the target position is a pre-stored entity word, determining that the second probability value of the candidate character is a positive number, wherein the pre-stored entity word is determined based on entity word recognition performed on remaining fragments other than the text fragment in a text to be processed.

15. The computer readable storage medium of claim 14, wherein the second probability value of the candidate character is in positive correlation with a number of times that the pre-stored entity word is applied in the remaining fragments of the text to be processed.

16. The computer readable storage medium of claim 14, wherein the operations further comprise:
in response to that the character string including the candidate character and the at least one character in the at least one position in the text fragment adjacent to the target position is not a pre-stored entity word, determining that the second probability value of the candidate character is zero.

17. The computer readable storage medium of claim 13, wherein the determining the overall feature information of the text fragment based on the fragment feature information of the text fragment and the fragment feature information of each of the plurality of reference text fragments comprises:
 determining the overall feature information of the text fragment by utilizing a multi-head-attention mechanism.

* * * * *